United States Patent [19]
Jyo et al.

[11] 3,956,569
[45] May 11, 1976

[54] PROCESS FOR THE SURFACE TREATMENT OF SYNTHETIC RESIN SHAPED ARTICLES WITH ALKYL HYPOHALITES

[75] Inventors: Yoshio Jyo, Yokohama; Kyouzi Inokuchi, Kawasaki, both of Japan

[73] Assignee: Nippon Zeon Co., Ltd., Japan

[22] Filed: Feb. 22, 1974

[21] Appl. No.: 444,968

[30] Foreign Application Priority Data
Feb. 27, 1973  Japan................................ 48-23516

[52] U.S. Cl.............................. 428/412; 427/180; 427/372; 427/400; 427/430; 428/474; 428/480; 428/521; 428/522; 428/523
[51] Int. Cl.².................... B32B 27/36; B32B 27/37
[58] Field of Search............... 117/47 A, 138.8 UA, 117/139, 138; 427/385

[56] References Cited
UNITED STATES PATENTS

| | | | |
|---|---|---|---|
| 2,878,519 | 3/1959 | Wolinski | 18/48 |
| 3,080,255 | 3/1963 | Winkelmann | 117/47 |
| 3,352,818 | 11/1967 | Meyer et al. | 260/45.7 |

FOREIGN PATENTS OR APPLICATIONS

| | | |
|---|---|---|
| 702,928 | 1/1954 | United Kingdom |

*Primary Examiner*—P. E. Willis, Jr.
*Attorney, Agent, or Firm*—Bucknam and Archer

[57] ABSTRACT

A process for treating the surface of a synthetic resin shaped article comprising contacting the surface of resin article with an alkyl hypohalite or with an alkyl hypohalite containing solid particles thereby providing the resin article with adhesiveness, hydrophilic property and other useful properties.

7 Claims, No Drawings

PROCESS FOR THE SURFACE TREATMENT OF SYNTHETIC RESIN SHAPED ARTICLES WITH ALKYL HYPOHALITES

This invention relates to a process for the surface treatment of a synthetic resin shaped article and more particularly it relates to a process for treating the surface of a synthetic resin shaped article by contacting the surface with an alkyl hypohalite to provide the synthetic resin article with excellent adhesiveness, coating receptivity, hydrophilic property, printability and plating receptivity.

Conventional processes for reforming or treating the surface of a synthetic resin shaped article, which have heretofore been proposed, include a process comprising polishing with emery-paper, a process comprising treating with chemicals such as chromic acid and a process comprising applying radiation or effecting corona discharge. These conventional processes do not satisfactorily apply to all synthetic resins and they when used will deteriorate resins in inherent properties such as mechanical strength and transparency. In addition, they require complicated steps. Furthermore, they can usually not provide resins with various properties, such as adhesiveness, coating receptivity, hydrophilic property, printability and plating receptivity, with which it is generally difficult to provide the resins, particularly resins having no ethylenic unsaturation.

The primary object of this invention is to provide a process for expediently treating the surface of resins thereby providing them with excellent adhesiveness, coating receptivity, hydrophilic property, printability, plating receptivity, and the like.

This object of this invention is achieved by contacting the surface of synthetic resin shaped articles with an alkyl hypohalite.

The synthetic resins having substantially no ethylenic unsaturation which may be used in this invention include a homopolymer of ethylene, propylene, styrene, vinyl chloride, methyl methacrylate or acrylonitrile; a copolymer of at least two of these monomers; a copolymer of at least one of these monomers and other vinyl monomer; a thermoplastic resin such as polycarbonate, polyamide, polyether or polyester resin; a thermosetting resin such as phenolic, urea-formalin, melamine-formalin or epoxy resin; a mixture of at least two of the aforesaid resins, homopolymers, and copolymers. They may also include a mixture of an ethylenically unsaturated polymer and at least one of the said resins, homopolymers and copolymers, the mixture also including an acrylonitrile-butadiene-styrene resin, methacrylonitrile-butadiene-styrene resin and so-called a high impact polystyrene. These resins are formed by use of molding, extrusion, injection and other usual forming techniques to desired shaped articles which are then used in the practice of this invention. The resins may be incorporated with fillers, reinforcements, plasticizers, stabilizers and anti-aging agents, if desired.

As the alkyl hypohalites which may be used for treating the surface of the resins, tertiary-alkyl hypohalites such as t.-butyl and t.-amyl hypohalites which are stable, are preferred to normal- or secondary-alkyl hypohalites with t.-butyl hypochlorite which is chemically stable being particularly preferred. In the practice of this invention these alkyl hypohalites may be used as they are, or may be used after diluted with an inert solvent. In the latter case, the alkyl hypohalites may be used in a concentration of at least 0.1 wt.%, preferably 1–20 wt.%. The solvents used herein include aliphatic hydrocarbons such as heptane, n-hexane and cyclohexane; aromatic hydrocarbons such as benzene, halogenated benzenes, toluene and xylene; ethers such as diethyl ether and dioxane; esters such as ethyl acetate; ketones such as methyl ethyl ketone and cyclohexanone; chlorinated hydrocarbons such as ethyl chloride, chloroform and carbon tetrachloride; tertiary alcohols such as t.-butyl alcohol, carbon disulphide and the like as well as the mixtures thereof.

The contact of the synthetic resin shaped articles with an alkyl hypohalite according to this invention is effected by immersing the articles in a solution of an alkyl hypohalite or by coating or spraying the alkyl hypohalite solution on the articles. In case of the immersion, the immersion time depends upon the kind of a synthetic resin used, concentration of an alkyl hypohalite solution used, kind of a solvent used and properties required in products to be obtained although it is usually in the range of from one second to ten hours, preferably 3 seconds to one hour; and the reaction temperature is in the range of 0°–150°C, preferably 10°–30°C.

It is also possible to effect a more effective reformation or attack on the surface of a synthetic resin shaped article by using an alkyl hypohalite solution incorporated with solid particles. The solid materials in a particulate form which may be used include metals in a powder form such as magnesium, calcium, titanium, aluminum, iron, zinc and barium; the oxides, chlorides, carbonates and sulphates of these metals; inorganic substances in a powder form such as glass, asbestos, clay, pearlite, zeolite and silicon compounds; and organic substances such as thermosetting and thermoplastic resin powders. These particles have usually a particle size of 0.01–1000 micron and are usually used in amounts of .–50 % by weight based on an alkyl hypohalite solution used.

As previously mentioned, the synthetic resin shaped articles treated with an alkyl hypohalite according to this invention (hereinafter referred to as "surface-treated synthetic resin article") have excellent adhesiveness, receptivity for coating, hydrophilic property, printability and receptivity for plate and they may thus be effectively used in the fields where at least one of their excellent properties is needed.

The surface-treated synthetic resin articles when used as an adhesive substrate, will exhibit an excellent bond therebetween and they will also an excellent bond with a metal such as iron, brass or aluminum as well as with lumber, glass, cement, leather, fibers or rubber. In this case, the surface-treated synthetic resin articles are either washed with water or not washed and then dried, and the dried articles so obtained are coated on the treated surface with an adhesive of an epoxy type, acrylate type, isocyanate type, rubber type, urea-formalin type or the like type thereby to form an adhesive layer with which a material to be bonded is bonded to the surface-treated articles. Alternatively, the surface-treated articles may be brought into a close direct contact with each other without using an adhesive therebetween and then dried thus completing the bond therebetween.

When the surface-treated synthetic resin articles are coated on the surface with a coating material such as an epoxy-, urethane-, urea-formalin-, acrylate-, alkyd-, rubber-, phenolic-, vinyl acetate-, phthalic acid-, cellulose nitrate-, melamine-, fluorine- or glass-based coating material, or natural resin-based paint such as japan-, cashew- or linseed oil-based paint, they will allow these paints to form a tough film thereon whereby they are improved in weatherproofing property, antiphotodegradation, ozone resistance, anti-gas permeability, chemical resistance, flame resistance, heat resistance and wear resistance as well as secondary properties such as mechanical strength of their surface.

Synthetic resin shaped articles are generally not satisfactorily printable due to their surface being hydrophobic and inert. In order to improve synthetic resins in printability there have been proposed a process for treating with chromic acid, a process contacting with flame, a process for treating with corona discharge, a process for introducing functional groups, and the like. However, these conventional processes are all time-consuming ones and are therefore not said to be economically and technically excellent ones. The treating process of this invention is superior in economy, treating techniques and effects obtained by the treatment as compared with the aforesaid conventional ones. The printability may be estimated from, for example, the degree of wetting of a resin with water, that is, the contact angle made by water drop with the resin, or the bond strength obtained by applying an adhesive tape to a cross-cut surface of the resin and then effecting repeated peeling of the tape therefrom. These estimating methods may be used in finding a guidance for estimating the coating receptivity of the resin.

A conventional process for plating a synthetic resin substrate with a metal generally comprises etching the resin substrate by the use of a mechanical technique such as honing or sand blast or by the use of a chemical technique such as a treatment with a bichromate-sulphuric acid solution, sensitizing, activating, chemically plating and then electroplating, thus completing the plating. By using the conventional process there is obtained a plated synthetic resin substrate which is light in weight and covered with a metallic coating whereby the plated substrate is improved in various mechanical properties. The treating process of this invention may be substituted for the etching step of the conventional plating process and, therefore, the use of the process of this invention in combination with the aforesaid conventional sensitizing, activating, chemical plating and electroplating steps can give a more excellently plated synthetic resin substrate. If desired, the process of this invention may be used in combination with the conventional plating process thereby to obtain, in certain cases, a plate further closely secured to a synthetic resin substrate. Since the conventional treatment of common-grade synthetic resins other than ABS resins wih a chromic acidsulphuric acid mixture does not have a satisfactory etching effect thereon, such common-grade synthetic resins have to be previously incorporated with a material which will make the surface of the resins uneven or rough when they are etched for the subsequent treatments; on the other hand, the process of this invention will have a satisfactory etching effect even on common synthetic resins containing no ethylenic unsaturation when used.

In this manner the process of this invention can provide synthetic resin shaped articles with various excellent properties and it would therefore be highly useful for industrial purposes.

Inspection of the surface of a synthetic resin shaped article treated by the process of this invention by the use of a scanning-type electron microscope revealed that the treated resin article had a remarkably uneven or rough surface which the original resin article did not have. The reason for this would be that since the original resin article was non-uniform in microstructure due to its degree of crystallization, proportion between the crystalline and non-crystalline portions, molecular orientation influenced during the forming operation, and other factors, part of the structure of the surface of the original resin article was corroded or swollen (for example, the non-crystalline portion of the original resin article was corroded to a greater extent) thereby making the surface remarkably rough. This roughing of the surface would be the cause for provision of a to-be-obtained product with such various excellent properties as previously mentioned.

This invention will be detailed by reference to the following examples.

EXAMPLE 1

Each of various synthetic resin test pieces having a size of 5 cm long × 1 cm wide × 2 mm thick and being prepared by the use of a press at 160°C except at 180°C only for polyethylene, was immersed for 30 minutes in each of t.-butyl hypochlorite (hereinafter referred to as "TBH"; purity, 98%) liquid and a solution of TBH in t.-butyl alcohol (hereinafter referred to as TBA) at each of room temperature and 50°C, and was then withdrawn from the liquid or solution. The treated test pieces so obtained were observed to inspect the surface condition thereof with the result being indicated in Table 1.

Separately, such polyethylene, polypropylene, polycarbonate and phenol resin samples were treated by immersion in TBH liquid at 70°C for 30 minutes, withdrawn from the liquid and then observed by the use of a scanning-type electron microscope to inspect the surface condition of the treated resin samples with the result that the samples respectively exhibited different changes in surface depending on the kind of resin from which they were made and the changes were all clearly found to be unevenness caused on the surface.

As mentioned above, it is clear from this Example that the surfaces of various synthetic resins can be remarkably changed or can be made remarkably rough.

Table 1

| Synthetic resin | TBH liquid (Treating liquid 1) | TBH/TBA (20/80 by volume) solution (Treating liquid 2) | | TBH/TBA (5/95 by volume) solution (Treating liquid 3) | | TBA liquid (Treating liquid 4) |
|---|---|---|---|---|---|---|
| | Room temp. | Room temp. | 50°C | Room temp. | 50°C | 50°C |
| High density polyethylene (Trade mark: Sholex produced by Showa Denko Co.) | B | B | B | A | A | A |
| Polypropylene (Trade mark: | | | | | | |

Table 1-continued

| Synthetic resin | TBH liquid (Treating liquid 1) | TBH/TBA (20/80 by volume) solution (Treating liquid 2) | | TBH/TBA (5/95 by volume) solution (Treating liquid 3) | | TBA liquid (Treating liquid 4) |
| --- | --- | --- | --- | --- | --- | --- |
| | Room temp. | Room temp. | 50°C | Room temp. | 50°C | 50°C |
| Noblen produced by Sumitomo Chemical Ind. Co.) | C | B | B | A | A | A |
| Polyvinyl chloride (Trade mark: Geon 103EP produced by Nippon Zeon Co.) | C | B | B | A | A | A |
| ABS resin (Trade mark: Denka A130 produced by Denki Kagaku Co.) | C | B | C | A | A | A |
| Polycarbonate (Trade mark: Panlite produced by Teijin Co.) | D | B | C | B | B | A |
| High impact polystyrene (Trade mark: Styrone 470 produced by Asahi Dow Co.) | E | E | E | B | C | A |
| Polystyrene (Trade mark: Styrone 666 produced by Asahi Dow Co.) | E | E | E | B | C | A |
| Polyester film (Trade mark: Mylar produced by Du Pont Co.) | C | C | C | A | B | A |
| Phenol resin (Trade mark: GE produced by Sumitomo Bakelite Co.) | C | B | C | A | B | A |
| Polymethylmethacrylate (Trade mark: Acrylite produced by Mitsubishi Rayon Co.) | E | E | E | B | C | A |

Note:
A : No change
B : Slightly swollen
C : Moderately swollen
D : Swollen to about twice the volume of the original
E : Dissolved

EXAMPLE 2

Each of samples of various synthetic resins was immersed in the same treating liquid as used in Example 1, at room temperature for 20 minutes, withdrawn from the liqiud, washed with water and then dried. The resin samples so treated were coated with an epoxy type adhesive (Trade mark: Bond E Set Clear produced by Konishi Gisuke Shoten Co.), allowed brass pieces (2 mm thick × 1 cm wide × 5 cm long) cleaned with acetone to be closely secured to the coated surface thereof and allowed to stand at room temperature for 2 days thereby curing the adhesive and completing the bond. The composites so obtained were tested by a Shopper-type tensile strength tester for their shearing force from which their bond strength was found. The results are shown in Table 2.

EXAMPLE 3

Various synthetic resin samples were immersed, at room temperature and for 20 minutes, in a solution prepared by incorporating the same treating liquid 2 as used in Example 1 with 40 wt.% of magnesium oxide (particle size: 0.1–0.3 micron), 20 wt.% of titanium oxide (through 325 mesh) or 20 wt.% of clay (particle size: 10 micron or finer), thereafter withdrawn from the inorganic powder-incorporated treating liquid and then dried without water washing. The aforesaid weight percentages were based on the treating liquid 2. The resin samples so treated were coated with the same adhesive as used in Example 2. The samples so coated were brought into close contact with each other and heated to 60°C for 20 minutes thereby curing the adhesive sandwiched in therebetween. The composites so obtained were then tested in the same manner as in Example 2 for their shearing strength. The results are indicated in Table 3, from which it is apparent that the incorporation of solid particles in a TBH liquid further improves synthetic resins in adhesiveness.

Table 2

| Synthetic resin | Shearing strength (Kg/cm²) | | | | |
| --- | --- | --- | --- | --- | --- |
| | Untreated | Treating liquid 1 | Treating liquid 2 | Treating liquid 3 | Treating liquid 4 |
| High density polyethylene | 0 | 10 | 0 | 0 | 0 |
| Polypropylene | 0 | 26 | 19 | 9 | 0 |
| Polyvinyl chloride | 9 | 78 | 84 | 40 | 0 |
| Polycarbonate | 0 | — | 42 | 40 | 0 |
| Polystyrene | 8 | — | — | 30 | 0 |
| Polyester film | 0 | 8 | 5 | 0 | 0 |
| Phenol resin | 42 | — | 50 | 45 | 0 |
| Polymethylmethacrylate | 12 | — | — | 37 | 0 |

Table 2 shows that the treatment by the process of this invention remarkably improves synthetic resins in adhesiveness.

Table 3

| Synthetic resin | Shearing strength (Kg/cm$^2$) | | | | |
| --- | --- | --- | --- | --- | --- |
| | Untreated | Treating liquid 2 | Treating solution 2 + magnesium oxide | Treating solution 2 + titanium oxide | Treating solution 2 + clay |
| Polypropylene | 0 | 13 | 23 | 30 | 22 |
| Polyvinyl chloride | 9 | 40 | 78 | 63 | 45 |
| Polyvinyl chloride/MBS resin (Trade mark: Hi-Blen 205 produced by Nippon Zeon Co.) (100/10) | 8 | 48 | 84 | 52 | 72 |
| Polycarbonate | 0 | 24 | 47 | 42 | 31 |

EXAMPLE 4

Various synthetic resin samples were immersed in the same treating liquid 2 as used in Example 1 for 20 minutes, withdrawn from the liquid, washed with water and then dried. The thus-treated samples were coated respectively with different coating materials and then tested for film strength. The test was made by cutting the film-formed resin samples in such a manner that the cuts just reached the surface of the resin substrate and they defined 100 film pieces each having an area of 1 mm × 1 mm by the cut lines, applying a filament tape No. 898 (produced by Sumitomo Three M Co.) to these film pieces and compressing together and then peeling the tape from the film pieces in the direction of 180° with respect to the film surface from one end of the tape to the other end to find how many of the film pieces were retained on the resin substrate without being peeled. The results are shown in Table 4.

Table 4

| Coating material | Epoxy type | | Acrylic acid type | | Phthalic acid type | | Aminoalkyd type | | Urethane type | |
| --- | --- | --- | --- | --- | --- | --- | --- | --- | --- | --- |
| Treatment Synthetic resin | None | Done | None | Done | None | Done | None | Done | None | Done |
| ABS resin | 30 | 100 | 100 | 100 | 0 | 100 | 5 | 50 | 10 | 30 |
| Polyvinyl chloride/MBS resin (100/10) | 45 | 100 | 70 | 100 | 41 | 100 | 22 | 40 | 6 | 15 |

From Table 4 it is clear that the treatment of a synthetic resin surface according to this invention permits the formation of a film extremely securely adhering to the synthetic resin surface.

EXAMPLE 5

Samples of an ABS resin were immersed in the same treating liquid 2 as used in Example 1 at room temperature for 5–40 minutes, thereafter washed with water and then dried. The samples so treated allowed 0.01 ml of distilled water to drop thereon and, after lapse of one minute, tested by the use of a goniometer type tester for contact angle at 20°C and a relative humidity of 62% to find the contact angle. The results are shown in Table 5 and indicate that the smaller the contact angle found is, the better the treated resin is wettable with water.

Table 5

| Immersion time (min.) | Untreated | 5 | 10 | 20 | 30 | 40 |
| --- | --- | --- | --- | --- | --- | --- |
| Contact angle | 79° | 76° | 72° | 68° | 65° | 60° |

From Table 5 it is apparent that the treatment of this invention improves synthetic resins in wettability with water and hydrophilic property. This means the improvement of the resins also in printability.

The aforesaid untreated resin samples and treated resin samples which had been treated for 30 minutes were subjected to an exposure test using a fade-O-meter to find the age change in tensile strength thereof. The results are shown in Table 6.

Table 6

| Exposure time (hour) | Tensile strength (Kg/cm$^2$) | | | |
| --- | --- | --- | --- | --- |
| | 0 | 40 | 110 | 150 |
| Untreated | 348 | 320 | 300 | 250 |
| Treated for 30 minutes | 345 | 318 | 295 | 253 |

Table 6 indicates that the treatment of resins according to this invention allows the treated resins to retain a tensile strength equal to that of the same resin untreated.

EXAMPLE 6

Sheets of the same common-grade polypropylene as used in Example 1 were immersed in a solution of a neutral detergent at 50°C for 3 minutes to remove from the sheets oils and other dirt attached thereto, and washed with water followed by being dried. These sheets were etched in the different ways indicated in Table 7, respectively, washed with methanol or water and then dried. The sheets so treated were immersed in a solution of stannous chloride in water 8 times the volume thereof at room temperature for 2 minutes (sensitization), thereafter immersed in a 5% aqueous solution of silver nitrate at room temperature for 5 minutes (activation) to convert the stannous chloride to stannic chloride thereby depositing silver on both the sides of the sheets. The silver-deposited sheets were further immersed in an aqueous solution (A : B : water = 1 : 1 : 4) of Top Methalate Process Chemical copper A liquid (containing mainly copper sulphate and Roscher salt) and B liquid (containing mainly formaldehyde), at room temperature for 20 minutes, withdrawn from the solution, brushed on the surface and then electroplated. The surface conditions of the electroplated resin sheets are indicated in Table 7.

Table 7

| Experiment No. | Etching method | Appearance of plate |
|---|---|---|
| 1 | No surface treatment | No plating |
| 2 | Immersed in a treating system of bichromic acid (75 parts)-sulphuric acid (1500 parts)-water (120 parts) at room temperature for 30 minutes | Mottled plated surface with portions being not plated |
| 3 | Immersed in TBH at 70°C for 30 minutes | Plate formed all over the resin surface |
| 4 | Immersed in TBH at 70°C for 30 minutes and further immersed in a system of bichromic acid (75 parts)-sulphuric acid (1500 parts)-water (120 parts) at room temperature for 5 minutes | Plate formed all over the resin surface |

In addition, a Scotch tape was applied to each of the plated sheets obtained in Experiments 3 and 4 and the whole was compressed together. The tape-attached plated sheets were attempted to rapidly peel the Scotch tape from the plated sheet substrate in the direction of 180° with respect to the sheet surface from one end of the sheet to the other with the result that the plated sheet of Experiment 3 allowed the plate to be partly peeled while the plated sheet of Experiment 4 exhibited no substantial change in the plate thereof.

From this Example it is seen that the treatment of this invention is also effective as an etching treatment for the subsequent plating.

What is claimed is:

1. A process for the surface treatment of a synthetic resin shaped article comprising contacting the surface of said article with a solution of at least one alkyl hypohalite in an organic solvent, said alkyl hypohalite being selected from the group consisting of butyl hypohalites and amyl hypohalites, the synthetic resin being a member selected from the group consisting of homopolymers of a monomer which is ethylene, propylene, styrene, vinyl chloride, methylmethacrylate or acrylonitrile, copolymers of at least two of said monomers, copolymers of at least one said monomer and a vinyl monomer, a mixture of one said resin and an ethylenically unsaturated polymer, polycarbonates, polyamide resins, polyether resins, polyester resins, phenol resins, urea-formalin resins, melamine-formalin resins, epoxy resins, acrylonitrile-butadiene-styrene resins, methacrylonitrile-butadiene-styrene resins, high impact polystyrenes and mixtures thereof.

2. A process according to claim 1, wherein the contact is carried out at 0° to 150°C for one second to 10 hours.

3. A process according to claim 2, wherein the alkyl hypohalite is used in solution in concentrations of at least 0.1% by weight.

4. A process according to claim 1, wherein the alkyl hypohalite is t.-butyl hypochlorite.

5. A process according to claim 1, wherein the alkyl hypohalite solution contains a solid material in a particulate form selected from the group consisting of magnesium, calcium, titanium, aluminum, iron, zinc and barium; the oxides, chlorides, carbonates and sulphates of said metals; and glass powder, asbestos, clay, pearlite, zeolite and inorganic silicon compounds.

6. A process according to claim 5, wherein the solid material has a particle size of 0.01–1000 microns.

7. A process according to claim 5, wherein the solid material is contained in amounts of up to 50% by weight of the alkyl hypohalite solution.

* * * * *